Figure 1:
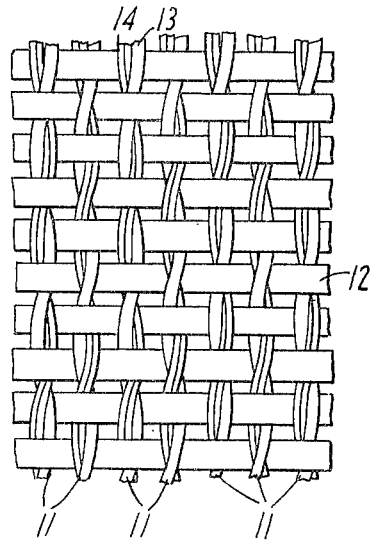

May 24, 1966    P. MEYER ETAL    3,252,484
FABRIC CONTAINING A THERMOPLASTIC COMPONENT
Filed Aug. 12, 1963    3 Sheets-Sheet 1

Inventors
Peter Meyer
Hans Meyer
By
Watson Cole Grindle & Watson
Attorneys

May 24, 1966  P. MEYER ETAL  3,252,484
FABRIC CONTAINING A THERMOPLASTIC COMPONENT
Filed Aug. 12, 1963  3 Sheets-Sheet 3

Inventors
Peter Meyer
Hans Meyer
By
Watson, Cole, Grindle & Watson
Attorneys

United States Patent Office 3,252,484
Patented May 24, 1966

3,252,484
FABRIC CONTAINING A THERMOPLASTIC
COMPONENT
Peter Meyer and Hans Meyer, both of 63 Jeddo Road,
London W. 12, England
Filed Aug. 12, 1963, Ser. No. 310,183
Claims priority, application Great Britain, Jan. 19, 1960,
1,889/60; Aug. 14, 1962, 31,120/62
7 Claims. (Cl. 139—426)

This is a continuation-in-part of application Serial No. 82,041, filed January 11, 1961, now abandoned.

The present invention relates to an improved fabric containing a thermoplastic component, which fabric is adapted to be caused to adhere to a textile material by the application of heat and pressure to the fabric applied in contact with said material. The novel fabrics according to the present invention may be utilized for producing tabs or labels suitable for attachment to other textile materials for identification or price-marking purposes.

As applied to a tab or label the novel fabric may be used for the formation of a removable tab or label intended for the identification of articles which are to be laundered or dry-cleaned, being intended for use, for example, in the same manner as is described in U.S. Patents Nos. 2,639,255, 2,639,266 and 2,828,776.

Materials for these various purposes may comprise a fabric structure some of the yarns of which consist of a thermoplastic material, for example a cellulose ester, and the form of fabric which was generally used in practice for the tabs or labels of said specifications, was a woven fabric which contained in the warp an alternating arrangement of thermoplastic and non-thermoplastic yarns, and in which the weft consisted of non-thermoplastic yarns.

In many cases use has been made of thermoplastic materials such as cellulose esters, particularly cellulose acetate, which are preferably treated with a solvent for the thermoplastic material before application to another surface with heat and pressure. Such solvent has the effect of temporarily reducing the softening point of such material to cause adhesion at a temperature below that which would scorch a textile article. The invention may be applied to fabrics comprising such thermoplastic materials, as well as fabrics comprising yarns of other thermoplastic materials which have properties such as permit the fabrics to be effectively applied to a textile material and caused to adhere thereto without the use of a solvent. Such yarns are those having a softening point which is already low enough to make the use of a solvent unnecessary. Examples of such yarns are copolymers of vinylidene chloride, such as the material sold under the trade name "Saran," polyvinyl chloride and polyamides of relatively low softening point such as the material sold under the trade name "Rilsan."

It has been found that tab or label fabrics wherein the wrap consists of thermoplastic and non-thermoplastic yarns in alternating sequence, particularly where a plain weave fabric construction is adopted, often call for the supply of the thermoplastic warp yarns to the weaving point at a substantially lower tension than the non-thermoplastic yarns if proper adhesion to another textile material is to be secured, and this tension must be accurately controlled if consistent adhesion of the tabs or labels from one batch of tab or label fabric to another is to be obtained. The supply of the thermoplastic yarns at a different tension from the non-thermoplastic yarns requires special let-off motion on the loom, complicates the production of such fabrics and has the effect of increasing the cost.

If certain specialized weaves such as those disclosed in U.S. Patent No. 2,828,776 are adopted, the difference between the tensions in the two classes of yarns is less, but it may still be necessary to provide for an accurate control of the tension of the thermoplastic yarns independently of the tension of the non-thermoplastic yarns with the consequent complication and increase in cost of the fabric. In general, it is easier and cheaper to produce a fabric in which all the warp yarns are handled at the same tension, and are supplied from a single warp beam, but practical experience has shown that satisfactory woven fabrics for the aforesaid purposes cannot generally be produced with a single warp beam. If a high denier acetate were used, such a yarn could in some cases be supplied at the same tension as the non-thermoplastic warp yarns, but experience shows that such yarn would still have to be supplied by a separate beam.

The object of the present invention is to provide a new fabric suitable for removable tabs or labels for marking articles which are to be laundered or dry-cleaned and which permits a fabric to be produced which fulfils the special requirement of this marking process and which can be produced at a relatively low cost.

The fabrics in accordance with the present invention may be woven fabrics in which various forms of weave may be adopted.

In accordance with the present invention a fabric composed of non-thermoplastic yarns and of thermoplastic yarns, utilises for the latter purpose a doubled yarn, that is a yarn produced by doubling or twisting together non-thermoplastic yarns and multiple continuous filament thermoplastic yarns.

The doubled yarns are produced by twisting the two component yarns together so that each of them is mutually twisted around the other and the resulting product is thus different in appearance and function from those types of composite yarn where one component yarn is twisted around the other, said other yarn, however, remaining itself substantially straight. The degree of twist adopted is comparatively moderate, being of the order of 6 to 20 turns per inch, such as gives maximum strength and weavability, but is less than that employed in some cases to produce crepe effects. Preferred degrees of twist lie between 10 and 16 turns per inch.

In preferred forms of fabric according to the invention all the yarns extending in one direction consist of doubled yarns and all the yarns extending in the other direction consist of non-thermoplastic yarn such as cotton or viscose. Preferably the non-thermoplastic yarn component in the doubled yarns consists of cotton, and the multiple thermoplastic filaments comprise cellulose acetate. The doubled yarns may be the warp yarns or they may be the weft yarns. In either case other yarns may extend in the same direction as the doubled yarns, such other yarns consisting of non-thermoplastic materials only and may be present over sections of the tab which are intended to form a non-adherent finger grip. For example, if the material is woven in the form of a tape from which separate tabs may be severed, one edge of the tape may consist of non-thermoplastic yarns only to a width of say 3 to 7 mm. to form a non-adherent finger grip. Where, as is preferred for economic reasons, the tab material is woven to full width on an ordinary loom and the wide cloth so produced is then slit lengthwise into tapes, the fabric may be woven with lanes consisting of non-thermoplastic warp yarns, slitting or cutting of the cloth into tapes being effected along the edges of such lanes so that the tabs produced have a non-adherent edge portion capable of providing finger grips on the tabs cut from such tapes.

If the doubled yarns are utilised as warp yarns the advantage is obtained that the warp yarns can be supplied from a single warp beam and that nevertheless it is possible to maintain control in the amount of thermoplastic yarn in the finished fabric by appropriate control in the production of the doubled yarns. If on the other hand the doubled yarns are used in the weft, the advantages are obtained that the fabric is easier to weave and there is less likelihood of yarn breakage. Furthermore, by using the doubled yarn in the weft it because unnecessary to produce special warp beams and consequently standard beams can be used. A further advantage in the use of doubled yarns in the weft as compared with using such yarns in the warp is that difficulties which sometimes occur due to yarn breakage do not arise. The normal way of minimising breakage of warp yarns is by sizing but sizing media which are compatible with both fibers both as regards application of the size and the subsequent removal of the size, are not readily available. This problem is likewise substantially overcome where the warp consists wholly of non-thermoplastic yarns which can be sized by normal procedures and the fabric subsequently easily desized, whereas there is, of course, no need to size the doubled weft yarns.

The accompanying drawings illustrate by way of example several forms of fabric in accordance with the present invention, as seen from one face of the fabric, which is in each case shown in a schematic and somewhat diagrammatic form, with the warp and weft yarns widely spaced and the drawings are not therefore intended to represent the appearance of the finished fabric.

As shown in FIG. 1 the fabric comprises weft yarns 12 and a plurality of identical warp yarns 11, these two sets of yarns being woven in a plain weave pattern, each warp and each weft yarn crossing alternately above and below adjacent single yarns in the other direction.

Each warp yarn 11 is a doubled yarn consisting of a component 13 of non-thermoplastic material, for example cotton, and a thermoplastic component 14, for example of cellulose acetate, preferably consisting of a plurality of fine filaments slightly twisted together in accordance with normal synthetic yarn spinning techniques, the two components 13 and 14 being twisted or doubled together somewhat in the manner indicated on the drawings. Because all the warp yarns are identical they may all be supplied from a common warp beam.

It will be understood that the fabric structure shown in FIG. 1 is symmetrical on the two faces and either face can be caused to adhere to another textile article by the application of heat and pressure, and either face is capable of accepting an identification marking. Such fabrics are applicable as marking tabs for identifying articles to be subjected to laundry or dry-cleaning operations.

Figure 2:
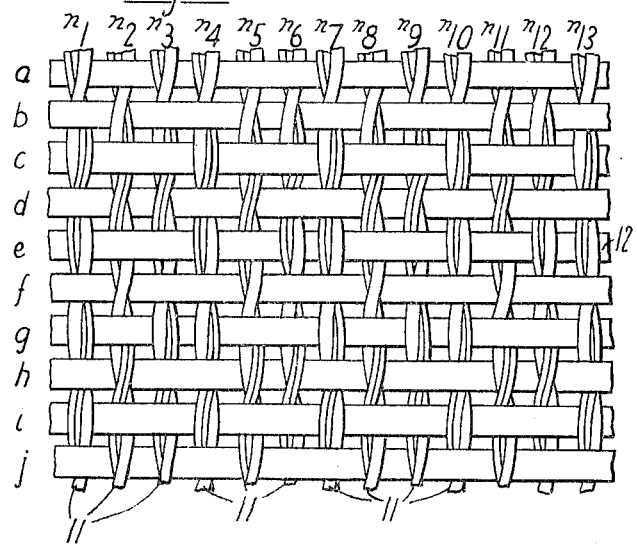

FIG. 2 illustrates another form of fabric wherein a different proportion of thermoplastic material is exposed on one face from that on the other. In this case all the warp yarns 11 are doubled yarns, but certain of the warp yarns are woven differently from the other warp yarns. In the piece of fabric shown, the warp yarns are numbered $n_1$–$n_{13}$, and the successive weft picks are indicated as $a, b, c$ . . . . The warp yarns $n_1$, $n_2$, $n_4$, $n_5$, $n_7$, $n_8$ and $n_{10}$ (and so on in the same series) cross alternately above and below single weft yarns 12 while the warp yarns $n_3$, $n_6$, $n_9$ (and so on) cross alternately over one weft yarn and then under two weft yarns and so on alternately. The warp yarns $n_3$ cross over the weft yarns $a, d, g$ and $j$, and the same applies to the warp yarn $n_9$ (and to $n_{15}$, $n_{21}$ and so on in series). The warp yarn $n_6$ (then $n_{12}$, $n_{18}$ and so on in series), however, cross over the weft yarns $b, e, h$, etc., and then in each case respectively under two following weft yarns. The face of the fabric shown in FIG. 2 will thus comprise a smaller quantity of exposed thermoplastic yarn material than the opposite, i.e., under face of the fabric, and, as applied to a marking tab for identifying textile articles, the upper face shown on the drawings is suited to receive a printed identification marking while the under face is suited as the adhesion face adapted to be caused to adhere to the article to be marked under heat and pressure.

Figure 6:
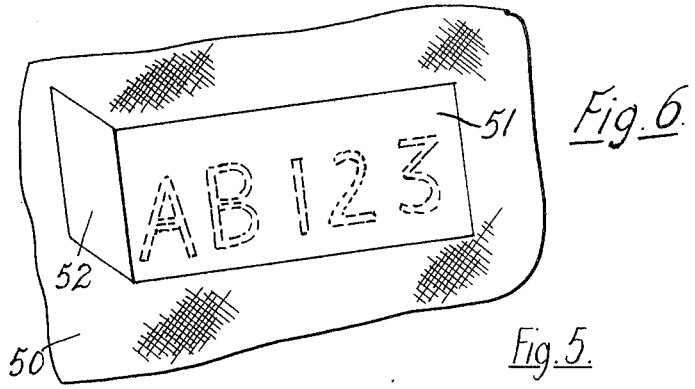

It will be understood that FIGS. 1 and 2 represent a fabric structure capable of being caused to adhere to other fabrics, but such structure may include zones comprising non-thermoplastic warp and weft yarns to provide non-adherable portions such as finger-grip portions. A tab cut from such a fabric and applied to an article is shown in FIG. 6. The section of fabric 50 is shown as provided with a label 51 thereon and having a portion 52 at the left end to indicate the portion which is the finger grip.

Figure 3:
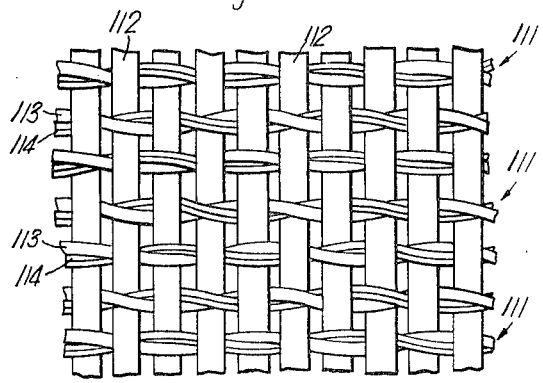
Figure 4:
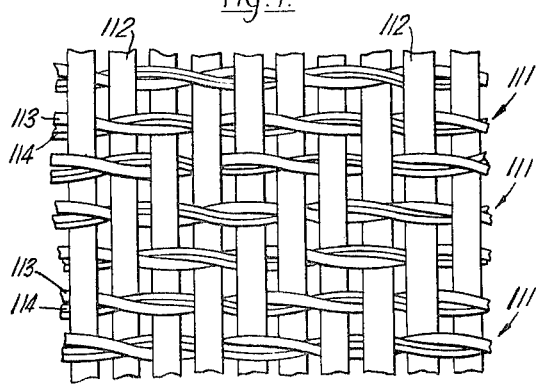
Figure 5:
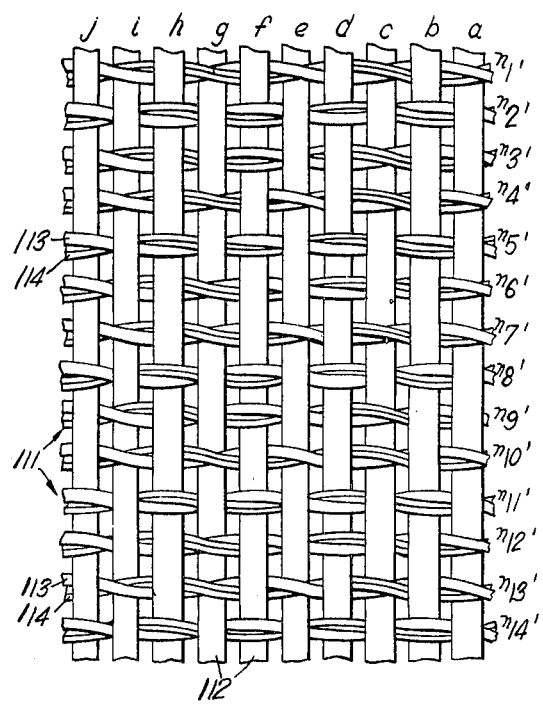

FIGS. 1 and 2 relate to embodiments of the invention where the doubled yarns comprise the warp yarns, while FIGS. 3, 4 and 5 relate to embodiments where the doubled yarns comprise the weft yarns.

As shown in FIG. 3 the fabric comprises warp yarns 112 and a plurality of identical doubled weft yarns 111, these two sets of yarns being woven in a plain weave pattern, each warp and each weft yarn crossing alternately above and below adjacent single yarns in the other direction.

Each weft yarn 111 is a doubled yarn consisting of a component 113 of non-thermoplastic material, for example cotton, and a thermoplastic component 114, for example of cellulose acetate, preferably consisting of a plurality of fine filaments slightly twisted together in accordance with normal synthetic yarn spinning techniques, the two components 113 and 114 being twisted or doubled together somewhat in the manner indicated on the drawings.

It will be understood that the fabric structure shown in FIG. 3 is symmetrical on the two faces and either face can be caused to adhere to another textile article by the application of heat and pressure, and either face is capable of accepting an identification marking. Such fabrics are applicable as marking tabs for identifying articles to be subjected to laundry or dry-cleaning operations.

It will, of course, be understood that a similar type of fabric to that of FIG. 1 may be designed with doubled yarns in the warp and which is woven on the two-up two-down basis in the form of a 2 x 2 twill weave. A similar type of fabric may also be utilized with a double weft, and such a fabric is shown on FIG. 4 of the drawings, the structure of the fabric being self-evident by reference to the drawings.

FIG. 5 illustrates another form of fabric wherein a different proportion of thermoplastic material is exposed on one face from that on the other. In this case all the weft yarns 111 are doubled yarns, but certain of the weft yarns are woven differently from the other weft yarns. In the piece of fabric shown, the weft yarns are numbered $n_{1'}$ to $n_{14'}$ and the successive warp yarns are indicated as $a, b, c$ . . . . The weft yarns $n_{1'}$, $n_{2'}$, $n_{4'}$, $n_{5'}$, $n_{7'}$, $n_{8'}$, $n_{10'}$ and so on in the same series cross alternately above and below single warp yarns 112, while the weft yarns $n_{3'}$, $n_{6'}$, $n_{9'}$ and so on cross alternately over one warp yarn and then under two warp yarns and so on alternately. The weft yarns $n_{3'}$ cross over the warp yarns $c, f$ and $i$ and the same applies to the weft yarn $n_{9'}$, and to $n_{15'}$, $n_{21'}$ and so on in series. The weft yarns $n_{6'}$, then $n_{12'}$, $n_{18'}$ and so on in series, however, cross over the warp yarns $a, d, g$ and $j$, etc., and then in each case, respectively, under two following warp yarns. The face of the fabric shown in FIG. 5 will thus comprise a smaller quantity of exposed thermoplastic yarn material than the opposite, i.e., under face of the fabric and, as applied to a marking tab for identifying textile articles, the upper face shown on the drawings is suited to receive a printed identification marking while the under face is suited as the adhesion face adapted to be caused to adhere to the article to be marked under heat and pressure.

The advantages of the new fabrics as compared with fabrics in which the thermoplastic and nonthermoplastic yarns are woven as separate entities may be summarised as follows:

In the case of FIGS. 1 and 2 all the warp yarns can be supplied from a common warp beam, which simplifies weaving of the new fabric. Further, in the case of FIGS. 1 to 5 control of the quantity of thermoplastic material present in the finished fabric can be accurately controlled in the production of the doubled yarns, enabling a fabric to be produced having precisely the required properties, and these properties are accurately reproducible and are constant throughout the fabric from one square cm. to the next.

Again, whereas it has been necessary or desirable heretofore in the production of temporary marking fabrics to utilize sized yarns, as is the usual practice in broadloom production, involving the subsequent step of desizing the fabric, it now becomes possible to utilize unsized yarns in many circumstances (depending on a number of factors such as the amount of twist in the yarn and the loom used), and the desizing step can therefore be omitted. Under these conditions strips of the desired width can be immediately slit from the broadloom cloth and reeled. As compared with a fabric with different warp yarns supplied at different tensions it has been found that a tab intended to bear identification characters, for example for marking articles to be laundered or cleaned, will carry printed markings which appear to be more resistant to attack during these operations and leave a more legible marking on the tab at the end of such operations.

A still further advantage of the new fabric as applied to a temporary marking tab or label is that residues, particularly of thermoplastic material, left on the surface of the articles after removal of the tab or label are substantially reduced as compared with tabs or labels produced from fabrics giving the same adhesion and containing individual thermoplastic and non-thermoplastic yarns.

As compared with the possible alternative of using blended staple yarns for the purposes above specified, doubled yarns have a number of advantages which may be summarized as follows:

(1) A more accurate control of the quantity of the thermoplastic present in the finished cloth is possible due to the greater consistency which can be achieved by the "doubling" process.

(2) If colored yarns are involved (as they may well be in the case of tab or label fabrics) the production of colored blended yarns leads to considerable difficulty due to the fact that a certain amount of fluff or "fly" is produced which tends to migrate through the air and affects other color blends, and this is particularly serious if white blends are produced in the same shed. These difficulties do not arise to a significant extent during the doubling process.

(3) Blended yarns involve a sizing operation and consequently the fabric leaving the loom must be desized.

The fabric is preferably woven to full loom width and is then slit to form tapes, the tapes being reeled and appropriately treated if necessary to minimize subsequent fraying at the edges. For laundry marking short tab lengths are cut from the tape to form tabs, the length of which corresponds to the width of the tape rolls, which are then treated, if necessary, with a solvent for the thermoplastic material and then applied under heat and pressure to the article to be marked, thus a non-adherent heat sealable finger grip portion being formed at one end to assist subsequent removal of the tab.

This finger grip is preferably formed by applying heat and pressure to all but an edge portion of the tab or label while it is being fixed to the article to be marked, the remaining portion thus not being stuck down and providing the non-adherent finger-grip portion.

In British Patent No. 849,439 (co-pending application Serial No. 115,931) design formulae are set out relating the various variables in fabric design coupled with the adhesion value of such fabrics when attached to other textile materials, and it has been found that, under similar extrinsic conditions, formulae of similar form can be evaluated for the tab or label fabrics covered by the present application.

When using cellulose acetate as the thermoplastic yarn the following formulae can be used to assist in the design of a fabric marking tab having a width of about 12.5 mm. In the case of a plain weave fabric, as shown in FIG. 1, the formula is:

$$8.7N - 19.4P - A + 550 = 0$$

where $N$ = the number of doubled warp yarn ends per cm.
$P$ = the number of picks per cm., and
$A$ = the pull in gm. applied to the non-adherent finger-grip end part of the tab in a direction along the surface of the tab and of the article to which it is attached, necessary for removing the tab from the article.

This formula is intended as an example and applies between the limits of 29 and 48 for factor N, 6 and 30 for P, and 280 and 900 for A, but the preferred limits are, respectively, 35 to 43 for N, 10 to 24 for P, and 400 to 700 for A, and is specifically applicable to doubled warp yarns which consist of 54s cotton and 200 denier acetate, the two component yarns being twisted together to an extent such as to give maximum weavability, say 6 to 20 turns per inch (preferably about 10–16 turns per inch), to an overall count of 18s. The weft employed is 80/2s or 40s cotton.

A fabric of the character shown in FIG. 2 may be designed on the basis of a formula of which the following is a typical example:

$$24.4N - 25.8P - A = 0$$

where the same yarns are used N, P and A have the same significance as above, but the limts are $N = 29$ to 51, and $P = 6$ to 28 with preferred limits of 36 to 48 and 12 to 26 respectively.

In the case of a plain weave fabric, as shown in FIG. 3 the formula is:

$$8.7P - 19.4N - A + 550 = 0$$

where $N$ = the number of warp yarn ends per cm.
$P$ = the number of picks of doubled yarn per cm., and
$A$ = the pull in gm. applied to the non-adherent finger grip end part of the tab in a direction along the surface of the tab and of the article to which it is attached, necessary for removing the tab from the article.

This formula is intended as an example and applies between the limits of 20 and 48 for factor P, 6 and 40 for N, and 280 and 900 for A, but the preferred limits are respectively 27 to 43 for P, 10 to 40 for N, and 400 to 700 for A, and is specifically applicable to doubled weft yarns which consist of 54s cotton and 200 denier acetate, the two component yarns being twisted together to an extent such as to give maximum weavability, say 6 to 20 turns per inch (preferably about 10–16 turns per inch) to an overall count of 18s. The warp employed is 80/2s or 40s cotton.

With comparatively minor variations in the formula given above it is possible to employ a cellulose acetate yarn of up to 280 denier and in general other yarns and other spacings may be used and in such cases similar formulae will apply, the main differences between these and the ones quoted in the parent case lying in the final constant term.

A fabric of the character shown in FIG. 5 may be designed on the basis of a formula of which the following is a typical example:

$$24.4P - 25.8N - A = 0$$

where the same yarns are used, N, P and A have the same significance as above, but the limits are P=29 to 51, and N=6 to 28 with preferred limits of 36 to 48 and 12 to 26 respectively.

For the design of a fabric of the character shown in FIG. 4 a formula may be used of a similar character to that given above with reference to FIG. 3 and the same limits given above are also applicable.

Heretofore the invention has been described in particular as applied to tab or label fabrics for marking laundry or dry-cleaning articles, but as indicated above, the features of the present invention are equally applicable to other fabrics adapted to be attached to textile materials by the action of heat and pressure, for example for price-labels. A non-symmetrical fabric as described with reference to FIGS. 2 or 5, and having a greater proportion of thermoplastic material in one face than on the other face, would be utilised in the case of a fabric intended to be attached to another textile article on one side only, whereas with a symmetrical fabric as in FIGS. 1, 3 or 4 this is not necessarily the case.

What is claimed is:

1. A closely woven single-ply fabric adapted to be heat-sealed to other fabrics by the action of heat and pressure following treatment with a solvent, comprising a first series of yarns all formed by doubling a potentially adhesive thermoplastic yarn with a non-thermoplastic yarn with both yarns mutually twisted one around the other, and a second series of yarns transverse to said first series of yarns and consisting of non-thermoplastic yarns, the two series of yarns being interlaced one with the other to form a plain weave fabric and produced according to the following formula:

$$8.7N - 19.4P - A + 550 = 0$$

where $N$ = the number of doubled first series yarns per cm.,
$P$ = the number of second series yarns per cm., and
$A$ = the pull in gm. applied to a non-adherent finger-grip end part of the tab formed from such a fabric in a direction along the surface of the tab and of an article to which it is attached, necessary for removing the tab form from the article, where N lies between 29 and 48, P lies between 6 and 30 and A lies between 280 and 900.

2. A closely woven single-ply plain weave fabric adaptable for forming identification labels capable of receiving and retaining a printing medium and removably attachable on the opposite surface to other textile materials by heat and pressure following treatment with a solvent, comprising a first series of yarns all of which consist of doubled yarns formed by combining a potentially adhesive thermoplastic yarn with a non-thermoplastic yarn, both yarns being mutually twisted one around the other respectively, and a second series of non-thermoplastic yarns running transversely to the first series, both series of yarns being woven in an interlacing pattern to form a cohesive fabric heat-sealable after treatment in a solvent for the thermoplastic yarn to a textile article after receiving a printed identification marking and subsequently removable from said article, the fabric being produced by the following formula:

$$8.7N - 19.4P - A + 550 = 0$$

where $N$ = the number of doubled first series yarns per cm.,
$P$ = the number of second series yarns per cm., and
$A$ = the pull in gm. applied to a non-adherent finger-grip end part of the tab formed from such a fabric in a direction along the surface of the tab and of the article to which it is attached, necessary for removing the tab form from the article, where N lies between 29 and 48, P lies between 6 and 30, and A lies between 280 and 900.

3. A fabric as claimed in claim 1, in which all the first series yarns are warp yarns and consist of mutually twisted doubled yarns and all the second series yarns are weft yarns and consist of non-thermoplastic yarns.

4. A fabric as claimed in claim 1, in which all the first series yarns are weft yarns and consist of mutually twisted doubled yarns and all the second series yarns are warp yarns and consist of non-thermoplastic yarns.

5. A closely woven single-ply fabric adapted to be heat-sealed to other fabrics by the action of heat and pressure following treatment with a solvent, comprising a first series of yarns all formed by doubling a potentially adhesive thermoplastic yarn with a non-thermoplastic yarn with both yarns mutually twisted one around the other, and a second series of yarns transverse to said first series of yarns and consisting of non-thermoplastic yarns, the two series of yarns being interlaced one with the other to form a preponderant weave fabric and produced according to the formula:

$$24.4N - 25.8P - A = 0$$

where $N$ = the number of doubled first series yarns per cm.,
$P$ = the number of second series yarns per cm., and
$A$ = the pull in gm. applied to a non-adherent finger-grip end part of the tab formed from such a fabric in a direction along the surface of the tab and of the article to which it is attached, necessary for removing the tab form from the article, where N lies between 29 and 51, P lies between 6 and 28, and A lies between 280 and 900.

6. A fabric as claimed in claim 5, in which all the warp yarns consist of mutually twisted doubled yarns and all the weft yarns consist of non-thermoplastic yarns.

7. A fabric as claimed in claim 5, in which all the weft yarns consist of mutually twisted doubled yarns and all the warp yarns consist of non-thermoplastic yarns.

References Cited by the Examiner

UNITED STATES PATENTS

| | | | |
|---|---|---|---|
| 2,158,112 | 5/1939 | Finlayson et al. | 139—420 |
| 2,209,238 | 7/1940 | Sperber | 28—73 |
| 2,423,366 | 7/1947 | Bloch | 139—426 |
| 2,446,414 | 8/1948 | Farrell et al. | 156—305 |
| 2,491,396 | 12/1949 | Seckel | 139—426 X |
| 2,765,814 | 10/1956 | Jordan | 139—426 |
| 2,824,035 | 2/1958 | Finlayson et al. | 156—305 |
| 2,828,776 | 4/1958 | Meyer | 139—420 |
| 2,864,151 | 12/1958 | Bihaly | 28—73 X |
| 2,890,567 | 6/1959 | Taylor et al. | 57—140 |
| 2,998,631 | 9/1961 | Meyer et al. | 139—426 X |
| 3,036,602 | 5/1962 | Meyer et al. | 139—420 |

FOREIGN PATENTS

| | | |
|---|---|---|
| 661,574 | 4/1963 | Canada. |
| 816,450 | 5/1937 | France. |

ROBERT R. MACKEY, *Acting Primary Examiner.*

DONALD W. PARKER, *Examiner.*